United States Patent [19]

Matsumoto

[11] 4,187,402

[45] Feb. 5, 1980

[54] METHOD OF CONTROLLING CHANNEL ASSIGNMENT IN A TIME DIVISION MULTIPLEXING NETWORK

[75] Inventor: Jun Matsumoto, Chiryu, Japan

[73] Assignee: Aiphone Co., Ltd., Nagoya, Japan

[21] Appl. No.: 909,689

[22] Filed: May 25, 1978

[30] Foreign Application Priority Data

Jun. 6, 1977 [JP] Japan .................................. 52-66548
Jun. 6, 1977 [JP] Japan .................................. 52-66549

[51] Int. Cl.² ............................................... H04J 3/00
[52] U.S. Cl. .............................. 179/15 BW; 179/15 A
[58] Field of Search .......... 179/15 A, 15 AT, 15 AQ, 179/15 BA, 18 FC, 15 BW, 15 BV

[56] References Cited

U.S. PATENT DOCUMENTS

| | | | |
|---|---|---|---|
| 3,641,272 | 2/1972 | Pinet et al. | 179/15 AT |
| 3,963,870 | 6/1976 | Cowder et al. | 179/15 AT |

Primary Examiner—Bernard Konick
Assistant Examiner—Joseph A. Popek
Attorney, Agent, or Firm—Kenway & Jenney

[57] ABSTRACT

In a time division multiplex network the channel assignment is controlled by assigning each channel, in a channel-by-channel sequence, to each subscriber pair that are communicating or wish to communicate. The subscriber address-data for the addressee and the addressor of each so-assigned channel are stored, respectively, in corresponding address locations of a transmission side circulating read/write memory and a receiving side circulating read/write memory. A reset word is stored in either the receiving side or the transmission side memory in a memory location following the last memory location containing subscriber address-data. The corresponding memory locations on the transmitting and receiving sides are read out in response to counter outputs and the subscriber address-data of each so-assigned channel are used to provide synchronous gating pulses to the respective modulation/demodulation units of the addressee and the addressor of each channel to establish communication therebetween. The reset word, when it is read out, resets the memories to repeat the memory read-out cycle. The number of occupied memory locations on the transmitting and receiving side varies directly in accordance with the traffic demands to provide high efficiency performance per unit time and high modulation/demodulation quality during periods of low traffic.

2 Claims, 6 Drawing Figures

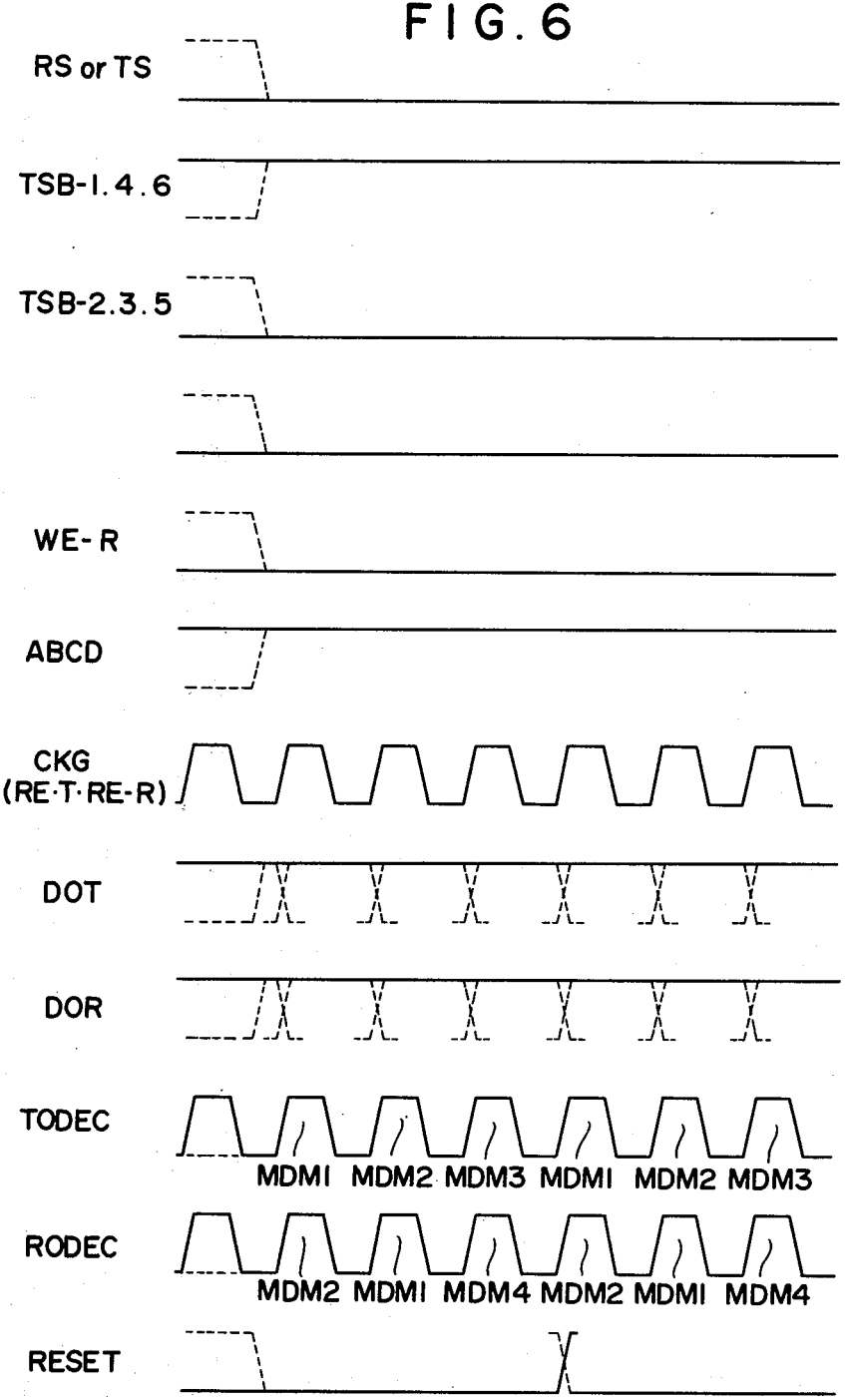

METHOD OF CONTROLLING CHANNEL ASSIGNMENT IN A TIME DIVISION MULTIPLEXING NETWORK

CROSS REFERENCE TO RELATED APPLICATION

The present invention is related to that disclosed in co-pending patent application Ser. No. 909,669 filed on even date herewith by the present inventor and assigned to the assignee of the present invention.

BACKGROUND OF THE INVENTION

The present invention relates to a method controlling channel assignment in a time division multiplexing network.

Conventionally, in time division multiplex networks such as time division exchanger, for the purpose of easily interconnecting a large number of subscribers by means of a small number of time division channels, a plurality of channels and pulse trains corresponding in phases are established, and the addresses of the transmitters and receivers stored in a circulating memory device thereby to assign the channels to the transmitters and receivers, respectively.

In such conventional systems, however, read-out pulses of the circulating memory device and the sampling pulses are separated from each other, and accordingly a complicated mechanism has been required for synchronizing these two kinds of pulses with each other. Further, another complicated mechanism has been required for reading-out the data stored in the memory device from outside of the network to review them, or for writing-in/rewriting.

SUMMARY OF THE INVENTION

The present invention is intended to eliminate the above mentioned shortcomings in the prior art.

Accordingly, an object of the invention is to provide a method of controlling channel assignment in a time division multiplexing network, wherein a novel mechanism is employed for synchronizing the read-out pulses of a memory device and the sampling pulses with each other.

Another object of the invention is to provide a method of controlling a time division multiplexing network, wherein a novel mechanism is employed for reading-out data which are stored in a memory device from outside of the network for reviewing them, or for writing-in/rewriting.

For achieving these objects, in the method of controlling channel assignment in a time division multiplexing network according to the invention, the read-out pulses of a circulating memory device, as they are read-out, are also utilized as sampling pulses, thereby to greatly simplify the control mechanism of the time division multiplexing network.

Further, according to the method of controlling the time division multiplexing network of the invention, a plurality of subscriber address-dots of those subscribers who desire transmission and reception in the networks are stored in a memory device. The plurality of subscriber address-data, which have been stored in the memory device, are reproduced in sequence at every predetermined times. The reproduced address data are transmitted to a PAM modulation/demodulation circuit in each address corresponding to the reproduced subscriber address-data, as sampling pulses corresponding to the time of reproduction. Analog signals which are transmitted by subscribers are modulated into time division multiplex PAM pulse signals, and are demodulated at a receiver, and, at the same time, stored address data are outputted to another output terminal in response to read-out signals and/or write-in signals from outside of the network, and/or new address data are written-in. According to the invention, the control mechanism can be very simple, and a review of state of the networks and write/in-rewrite of data from outside are made possible.

The above and other objects and advantages of the invention will be apparent from the following description taken in connection with the accompanying drawings.

BRIEF DESCRIPTION OF THE DRAWINGS

FIG. 6 shows the states of various signals used for internal reading-out in the embodiment of FIG. 4.

DETAILED DESCRIPTION OF THE PREFERRED EMBODIMENTS

An embodiment wherein the invention has been applied to a time division multiplexing exchange system will now be described in connection with the drawings.

Figure 1:
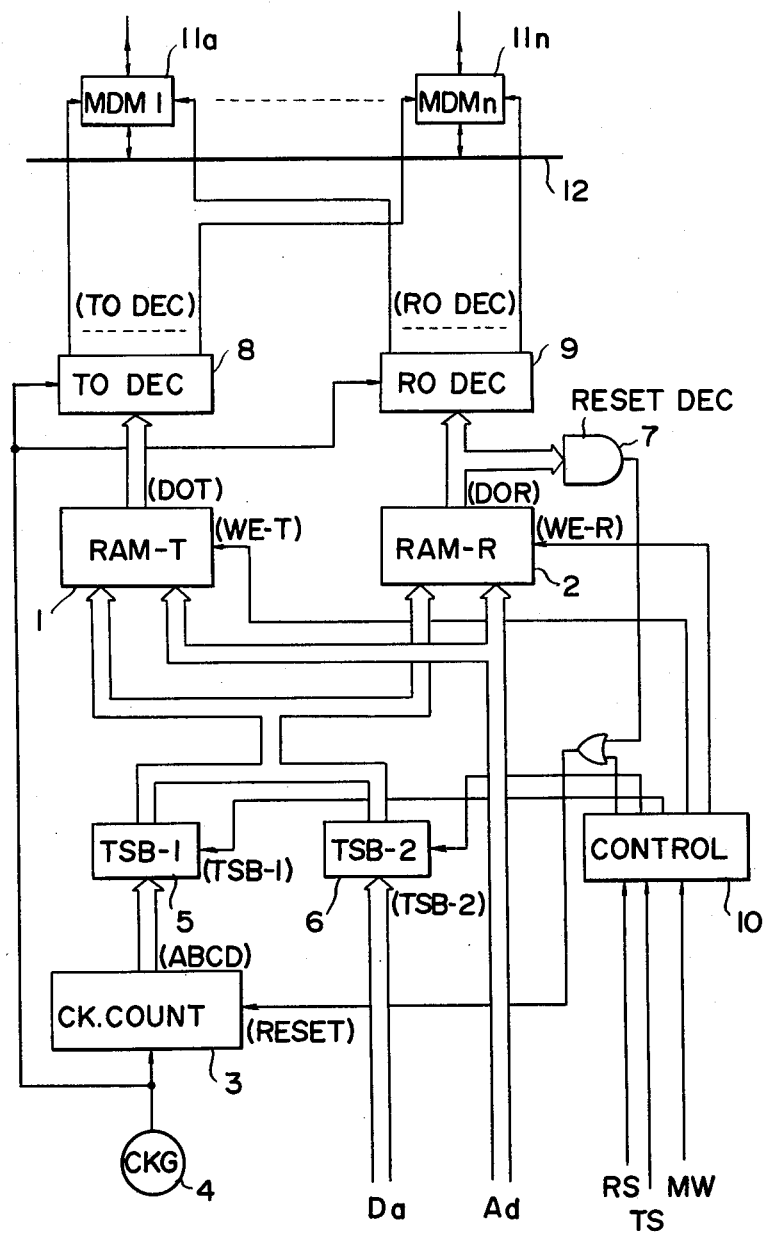
FIG. 1 is a block diagram showing an embodiment of the method of controlling channel assignment in a time division multiplexing network of the invention.

As shown in FIG. 1, memory circuits RAM-T 1 and (RAM-R) 2 consist of IC memories which are capable of read-out and write-in operations, respectively, where RAM-T 1 stores the transmitter's address data and RAM-R 2 stores the receiver's address data.

A clock counter CK.COUNT 3 is a register which counts clock pulses and selects, at each the time of each count, addresses to be read-out from RAM-T 1 and RAM-R 2 by BCD codes. When data which have been read-out from RAM-T 1 or from RAM-R 2 which is indicated in this embodiment, are reset data, CK.COUNT 3 will be reset to repeat counting. A clock CKG 4 is adapted to supply clock pulses to CK.COUNT 3, and also performs decode-controls of output decoders 8 and 9 for RAM-T 1 and RAM-R 2, as will be described in detail hereinbelow. Tri-state buffers TSB-1 5 and TSB-2 6, which do not interfere with each other, function to replace write-in addresses Da with read-out addresses by CK.COUNT 3 when data of addresses are written in RAM-T 1 and RAM-R 2. A reset circuit RESET DEC 7 functions to detect output data from RAM-T 1 or from RAM-R 2 which is indicated in this embodiment, and when reset data is detected, to reset CK.COUNT 3. Decorders TO DEC 8 and RO DEC 9 decode, respectively, output data from RAM-T 1 and RAM-R 2, and supply sampling synchronizing transmission and reception pulses, respectively, to the PAM time division multiplex network. A control portion CONTROL 10 functions to control, by means of signals from an outside source requiring writing-in or rewriting in RAM-T 1 and RAM-R 2, i.e., the signal of TS selecting RAM-T 1, the signal of RS selecting RAM-R 2 and the signal of MW requiring writing-in, RAM-T 1, RAM-R 2, TSB-1 5 and TSB-2 6 at each time of receiving the signal, and at the same time, to reset CK.COUNT 3.

Thus, unless a signal is applied to RS or TS, CONTROL 10 opens TSB-1 5, closes TSB-2 6, and makes RAM-T 1 and RAM-R 2 in a read-out mode. On the other hand, when a signal is applied to RS or TS, CONTROL 10 will close TSB-1 5 and open TSB-5 6, further, in case a write-in signal is applied to MW, CONTROL 10 changes RAM-R 2 to a write-in mode when RS is supplied with a signal, and changes RAM-T 1 to the write-in mode when TS is supplied with a signal, thereby to write-in address data which are provided by Ad, in an address selected by Da at that time. CONTROL 10, further, resets CK.COUNT 3 during the time when TS or RS is supplied with a signal, MW.

By means of outputs from TO DEC 8 and RO DEC 9, a PAM pulse signal is applied to and received from a time division multiplexing path 12 by each of PAM modulation/demodulation portions MDM1 11a to MDMn 11n.

Operation wherein signals are supplied:
from MDM1 (address 1) to MDM2 (address 2),
from MDM2 (address 2) to MDM1 (address 1), and
from MDM3 (address 3) to MDM4 (address 4)
will be described.

In this case, (0001) is written in the address 0 of RAM-T 1, and (0010) in the address 0 of RAM-R 2, and then (0010) is written in the address 1 of RAM-R 2, (0001) in the address 1 of RAM-R 2, (0011) in the address 2 of RAM-T 1, and (0100) in the address 2 of RAM-R 2, and, finally, reset data (1111) is written in the address 3 of RAM-R 2, as shown in the following table:

| Address | Data RAM-T | →→ | RAM-R |
|---|---|---|---|
| 0 | 0001 | | 0010 |
| 1 | 0010 | | 0001 |
| 2 | 0011 | | 0100 |
| 3 | XXXX | | 1111 |
| . | | | XXXX |
| . | | | |
| . | | | |
| m | XXXX | | XXXX |

Writing-in is performed selecting by TS or RS so that the data is written in either RAM-T 1 or RAM-R 2, setting Da to the above addresses, and supplying a writing-in signal to MW. With predetermined address data having been written-in or rewritten in RAM-T 1 and RAM-R 2, upon removing the signals at TS and RS, the written-in address data will be read-out by CK.COUNT 3 in sequence and be decoded by TO DEC 8 and RO DEC 9, and a sampling synchronizing pulse will be applied to PAM modulation/demodulation portions of MDM1 to MDMn which correspond to the read-out subscriber address data.

Figure 2:
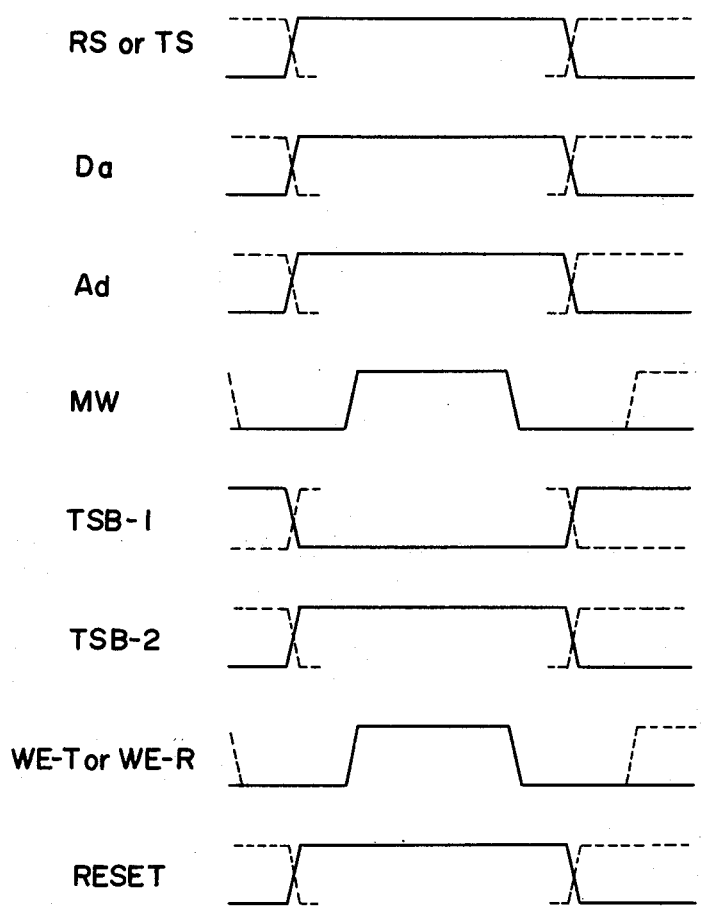
FIG. 2 shows the states of various signals used for writing-in in the embodiment of FIG. 1.

The state of the above mentioned operation is shown in FIG. 2.

As shown in FIG. 2, when writing-in has been finished and no signal remains in TS and RS, RAM-T 1 and RAM-R 2 are in their read-out mode, TSB-1 5 is opened and TSB-2 6 is closed, and, at the same time, CK.COUNT 3 changes from the reset state to the count state to begin counting the clock pulses of CKG 4 from zero. Upon this, subscriber addresses (0001) and (0010), which have been stored in the addresses 0 of RAM-T 1 and RAM-R 2, respectively, when output of CK.COUNT 3 has been (0000), are read-out. The transmitting gate of MDM1(11a) is opened by TO DEC 8 and RO DEC 9, PAM pulse signals are supplied on the time division multiplexing path 12, and, at the same time, the receiving gate of MDM2 is opened to receive the PAM pulse signals transmitted from MDM1. Thus, one sample value is transmitted from MDM1 to MDM2. Upon the next count the output of CK.COUNT 3 becomes (0001) subscriber address-data (0010) and (0001) which were stored in the addresses 1 of RAM-T 1 and RAM-R 2 are read-out, and one sample value is transmitted from MDM2 to MDM1. And, when the reset data (1111), which is stored in the address 3 of RAM-R 2, is read-out and is detected by RESET DEC 7 for resetting CK.COUNT 3. After this, CK.COUNT 3 again begins counting from zero and the above procedure is repeated.

Figure 3:
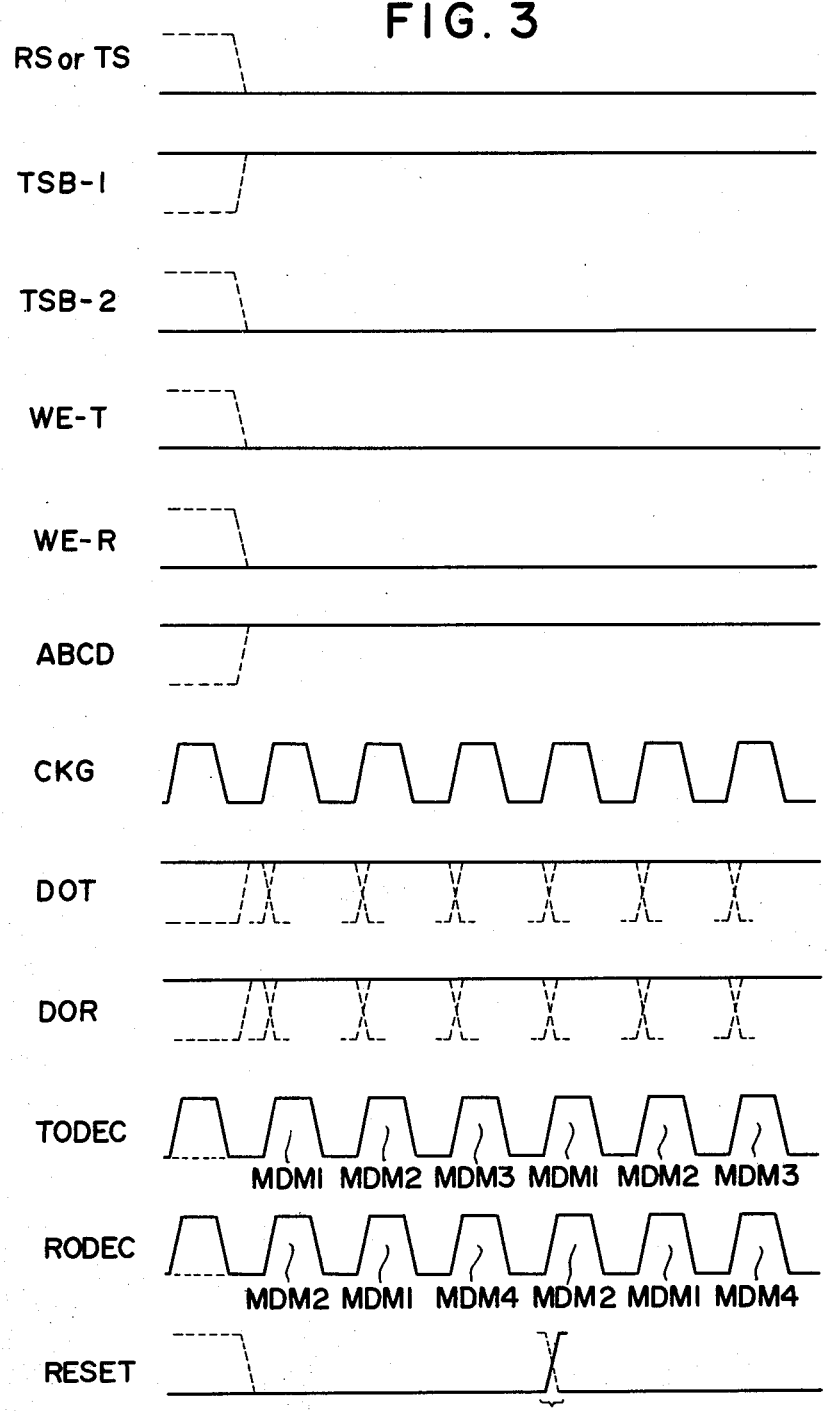
FIG. 3 shows the states of various signals used for reading-out in the embodiment of FIG. 1.

In such a manner, the PAM modulation/demodulation portions of MDM1 to MDMn are subjected to control until a new writing-in or rewriting of the contents in RAM-T 1 and RAM-R 2 the is completed, thus network being constituted. The state of operation at this time is shown in FIG. 3. In the case of a rewrite, reset data is written in the laste position of effective data.

Here, memory size m of RAM-T 1 and RAM-R 2 will be the number of all the channels (1 channel for one direction). In the above embodiment, the address data is expressed in 4 bit words. However, in general, when n is taken as the number of PAM modulation/demodulation portions, the number of bits of n' is needed as determined from the following equation:

$$n = 2^{n'}$$

In this case, CK.COUNT 3 will be constructed as a counter of at least modulo m system, and the word length in the one address of RAM-T 1 and RAM-R 2 will be n' bits.

Here, construction of TSB-1 5 and TSB-2 6 will be of m' bits, m' being determined from $$m = 2^{m'}$$

Also, RESET DEC 7 will have a construction of n' bits, and capacity of TO DEC 8 and RO DEC 9 will be n' bits and n outs. Consequently, Da and Ad will be of m' bits and n' bits.

Here, clock frequency fck necessary for CKG 4 is represented by $$fck = 2fs.m$$

where m is the number of the above mentioned all channels, fs is the maximum frequency in the transmission band, and 2 is a coefficient according to the sampling theorem.

Also, when mch is taken as the number of channels for guaranteeing demodulation of fs, then the following relationship of:

$$fck = 2fs.mch$$

is allowed, and accordingly, as the number of channels to be used increases, sampling frequency to be applied to one PAM modulation/demodulation portion decreases, and in case the number of channels exceeds the mch, fs will not become guaranteed.

For example, if the number of PAM modulation/demodulation portions is taken as 16, the number of all the channels as 8, the number of effective channels as 4, and the transmitting band as 8 KHz, then the relevant members will be as follows:

| | |
|---|---|
| CK.COUNT | octal counter, |
| TSB-1, TSB-2 | 3 bits |
| RAM-T, RAM-R | 8 ×0 4 bits, |
| RESET DEC | 4 bits, and |
| TO DEC, RO DEC | 4 bits, 16 outs. |
| fck which is needed will be | |
| fck = 2 · 8 (KHz) × 4 | |
| = 64 (KHz), | | thus 64 KHz being sufficient for fck.

Control for writing-in and rewriting from the outside, i.e., control for Da, Ad, TS, RS and MW will now be described. Since, during the time of this control, the supply of sampling synchronizing pulses to the PAM modulation/demodulation portions is stopped, the control must be carried out within a short time. From this point of view, it is preferable to perform the control by means of a processor or a computer rather than in a manual fashion. According to an experiment, in the case where the transmission signal is an audio signal, a period of time up to about 12.5 msec for one control could be negligible for rewrite per sec.

Another embodiment wherein the invention was applied to a time division multiplexing exchange system will now be described in connection which the drawings.

Figure 4:
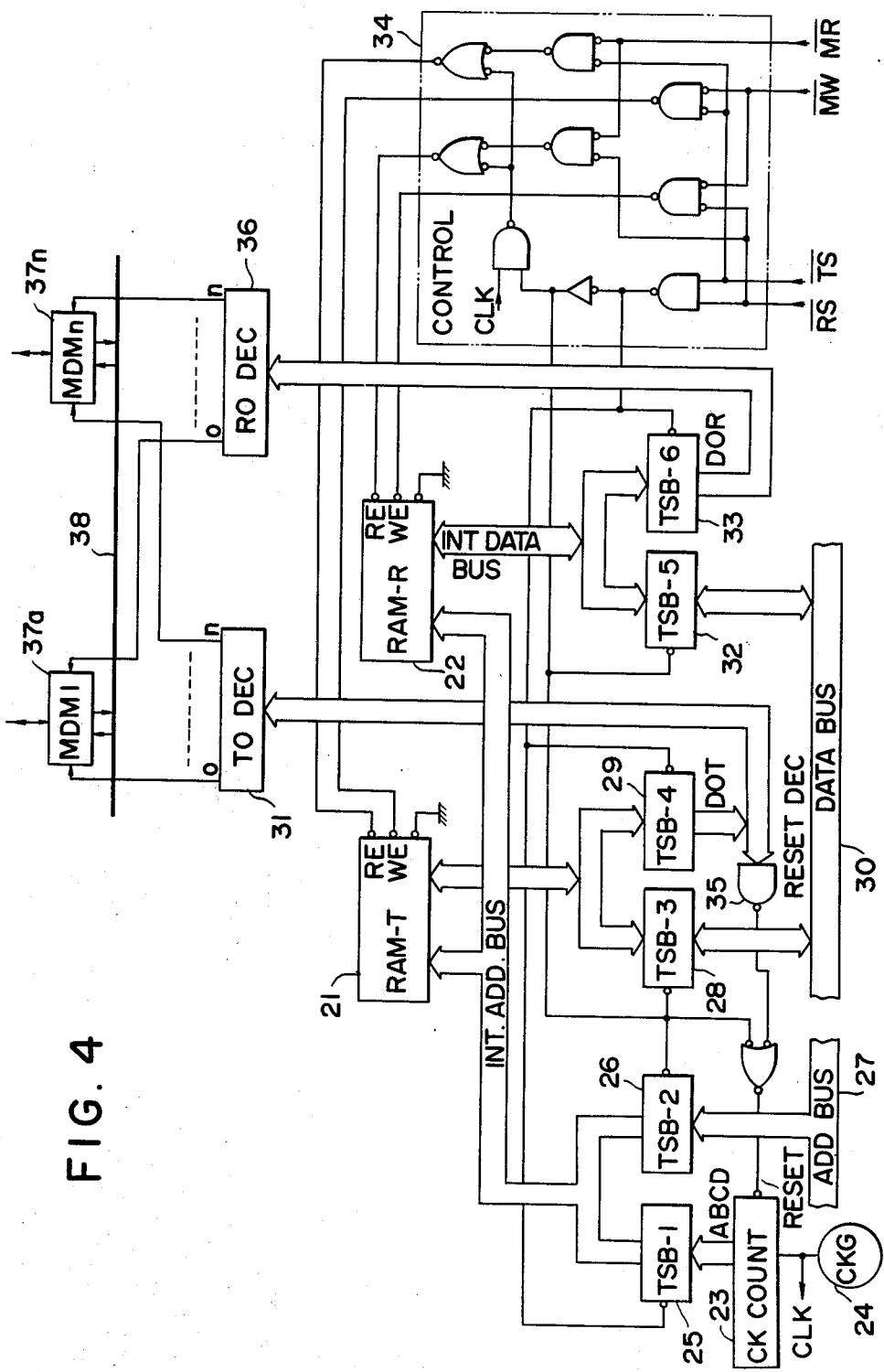
FIG. 4 is a block diagram showing another embodiment of the method of controlling channel assignment in a time division multiplexing network of the invention.

As shown in FIG. 4, memory circuits RAM-T 21 and RAM-R 22 consist of IC memories capable of read-out and write-in operations, respectively. The RAM-T 21 is adapted to store the transmitter's address data, and the RAM-R 22 is adapted to store the receiver's address data.

A clock counter CK.COUNT 23 is a register counts clock pulses and selects, at the time of each count, addresses to be read-out from RAM-T 21 and RAM-R 22 by BCD code. When data which have been read out from RAM-R 22 or from RAM-T 21 which is indicated in this embodiment as reset data, CK.COUNT 23 will be reset to repeat counting. A clock CKG 24 which is adapted to apply clock pulses to CK.COUNT 23, and, at the same time, applies, through a control portion CONTROL 34, which will be described in detail hereinbelow, timing signals for reading-out to RAM-T 21 and RAM-R 22. TSB-1 25 and TSB-2 26 are are tri-state buffers having no mutual interference which are adapted, when address data are written in RAM-T 21 and RAM-R 22 or are read out from the outside, to replace a write-in or read-out address which is selected by an address transmission path ADD.BUS 27, with an interior read-out address by CK.COUNT 23.

A tri-state buffer TSB-3 28 functions, along with a tri-state buffer TSB-4 29, to changeover input/output data of RAM-T 21. Thus, TSB-3 28 functions to apply address data (transmitter's address data in this embodiment), which have been read out according to read-out address which are usually supplied by CK.COUNT 23, to a decoder TO DEC 31, which will be described in detail hereinbelow, without any influence to an exterior data input/output DATA.BUS 30, and, in case of writing-in or reading-out address data according to the outside demands, functions to connect DATA.BUS 30 with the input/output of RAM-T 21 without any influence to TO DEC 31. Tri-state buffers TSB-5 32 and TSB-6 33 also have, for RAM-R 22, similar functions as TSB-3 28 and TSB-4 29. TSB-1 25 to TSB-6 33 may be controlled by the control portion CONTROL 34, which will be described in detail hereinbelow, according to the demands from the outside.

A reset circuit RESET DEC 35 functions, during read-out operation by COUNT 23 and in case the output data of RAM-R 22 or of RAM-T 21 as shown in this embodiment is reset data, to detect the data for resetting CK.COUNT 23. Decoders TO DEC 31 and RO DEC 36 decode output data of RAM-T 21 and RAM-R 22, respectively, and supply sampling synchronous pulses, respectively, for transmission and reception in a PAM time division multiplexing network. The control portion CONTROL 34 functions, by means of signals from an outside source requiring write-in or rewrite or read-out for RAM-T 21 and RAM-R 22, i.e., the TS signal selecting RAM-T 21, the RS signal, selecting RAM-R 22, the MW signal requiring write-in, the MR signal requiring read-out, to control RAM-T 21, RAM-R 22, and TSB-1 25 to TSB-6 33 at each time, and simultaneously has a function to reset CK.COUNT 3.

PAM modulation/demodulation portions MDM1 37a to MDMn 37n each supply, by sampling synchronous pulses from TO DEC 31 and RO DEC 36, PAM pulse signals to a time division multiplexing path 38, and receive them from the path.

Operation of the apparatus for writing-in address data in RAM-T 21 and RAM-R 22 from the outside will now be described.

Operation for sending signals:
from MDM1 (address 1) to MDM2 (address 2),
from MDM2 (address 2) to MDM1 (address 1), and
from MDM3 (address 3) to MDM4 (address 4)
will be described.

First, 0001 is written in the address 0 of RAM-T 21 and 0010 in the address 0 of RAM-R 22, then 0010 is written in the address 1 of RAM-T 21, 0001 in the address 1 of RAM-R 22, 0011 in the address 2 of RAM-T 21, and 0100 in the address 2 of RAM-R 2, and finally the reset data (1111) is written in address 3 of RAM-T 21, as shown in the following table:

| Address | Data RAM-T | →→→ | RAM-R |
|---|---|---|---|
| 0 | 0001 | | 0010 |
| 1 | 0010 | | 0001 |
| 2 | 0011 | | 0100 |
| 3 | 1111 | | XXXX |
| . | | | XXXX |
| . | | | |
| m | XXXX | | XXXX |

Writing-in is performed by setting an address of RAM-T 21 or RAM-R 22, in which data are to be written-in, to the external ADD.BUS 27, and selecting by TS or RS so that the data to be written is placed in either RAM-T 21 or RAM-R 22.

Here, with a signal being applied to TS, for example, CONTROL 34 closes TSB-1 25, TSB-4 29 and TSB-6 33, and opens TSB-2 26, TSB-3 28 and TSB-5 32 thereby to connect the external DATA.BUS 27 and ADD. BUS 30 to RAM-T 21 and RAM-R 22, and the internal TO DEC 31 and RO DEC 36 and CK.COUNT 23 are disconnected. In this state, with a direction of writing-in being applied to MW, a writing-in direction is applied to RAM-T 21 by CONTROL 34, and RAM-T 21 writes-in address data, which are supplied by DATA.BUS 30, in an address which is selected by the external ADD.BUS 27. At this time, if the signal is applied to RS rather than TS, the address data are written in RAM-R 22 in a similar manner.

Further writing-in is performed in a similar manner by setting predetermined addresses and address data to ADD.BUS 27 and DATA.BUS 30, respectively, and applying signals to TS and RS, with MW.

Operation for reading-out, from the outside, address data, which have been written in RAM-T 21 and RAM-R 22, will now be described.

An address to be read-out is selected and provided to the ADD. BUS 27, and the read-out direction is determined by TS and RS so that the reading-out is from either RAM-T 21 or RAM-T 22. With this, in a smilar manner as the above-described writing-in, TSB-1 25, TSB-4 29 and TSB-6 33 are closed by CONTROL 34, and TSB-2 26, TSB-3 28 and TSB-5 32 are opened. Then, with MR being supplied for directing reading-out the subscriber, address-data in RAM-T 21 in the case where TS is selected, and, the subscriber address-data in RAM-R 22, which are selected by ADD.BUS 27, in the case where RS is selected, are read-out and are transmitted to the DATA.BUS 30 through TSB-3 28 or TSB-5 32.

Figure 5:
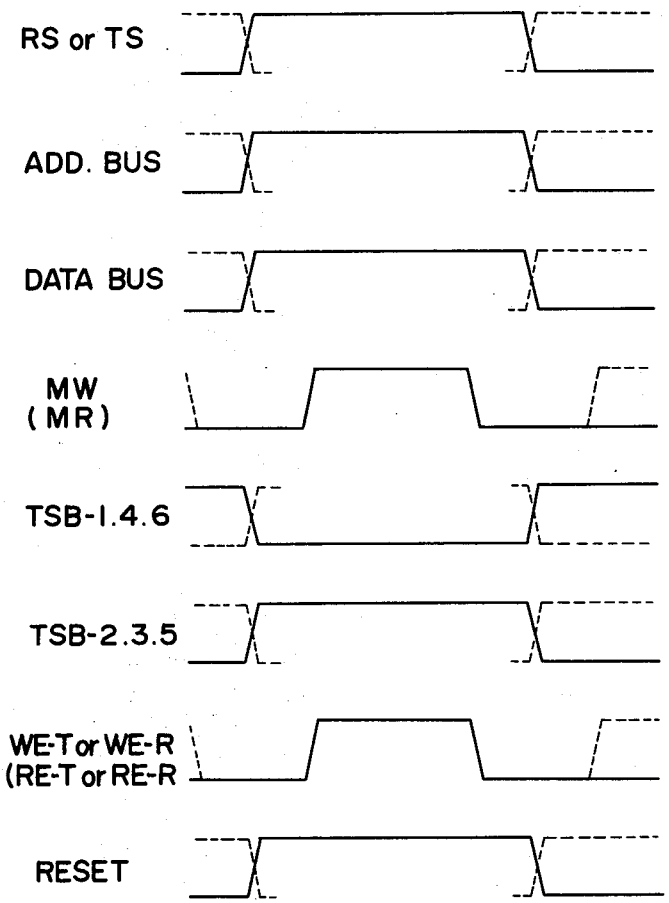
FIG. 5 shows the states of various signals used for writing-in or reading-out from outside in the embodiment of FIG. 4.

The operation state of the above-described writing-in and reading-out is shown in FIG. 5.

The operation of internal reading-out will now be described.

Except the case of the above-described writing-in or reading-out performed by external directions, i.e., the case where TS and RS are supplied with signals, normally TSB-1 25, TSB-4 29 and TSB-6 33 are opened and TSB-2 26, TSB-3 28 and TSB-5 32 are closed by CONTROL 34, and timings for reading-out are supplied to RAM-T 21 and RAM-R 22 in sequence by clock pulses CLK of CKG 24, and, at the same time, addresses to be read-out are selected by CK.COUNT 23, and address data which have been read out are supplied to TO DEC 31 and RO DEC 36 through TSB-4 29 and TSB-6 33, respectively, to be converted to binary there, and sampling synchronous pulses are applied to a PAM modulation/demodulation portion among MDM1 37a to MDMn 37n which is relevant to or corresponds to the address data. Thus, unless TS or RS is supplied with a signal, data which have been written-in are read-out by CKG independently from the outside, and the PAM time division multiplexing network is thereby controlled. The above process will be as follows in the above-described embodiment. When output of CK.COUNT 23 is (0000); subscriber addresses (0001) and (0010) which have been stored in the addresses 0 of RAM-T 21 and RAM-R 22 are read out, transmission gate of MDM1 37a is opened by TO DEC 31 and RO DEC 36, i.e., PAM pulse signals are transmitted to the time division multiplexing path, and, at the same time, the receiving gate of MDM2 (not shown) is opened for receiving the PAM pulse signals which have been transmitted from MDM1. That is, one sample value is transmitted from MDM1 to MDM2. In a similar manner, when the count of COUNT 23 has advanced and the output has becomes (0001) subscriber addresses; (0010) and (0001) which are stored in the addresses 1 of RAM-T 21 and RAM-R 22 are read-out, and one sample value is transmitted from MDM2 to MDM1. When the reset data (1111) which is stored in the address 3 of RAM-T 21 is read out, RESET DEC 35 detects this data to reset CK.COUNT 23. CK.COUNT 23 then begins to count from (0000) again, and the above procedure is repeated. Thus, these repeated frequencies are sampling frequencies for MDM1 to MDMn to effect time division multiplexing.

The operation states of the above-described reading-out is shown in FIG. 6.

As will be seen from the above description, in the method of the invention, as the number of channels increases, i.e., as the quantity of effective data of RAM-T 21 and RAM-R 22 the quantity of numbers which are smaller than the reset data which are written in the last positions, the sampling frequency becomes, in effect, lower. That is, as the number of channels used becomes less, signals of better quality will be transmitted.

Here, memory size (m) of RAM-T and RAM-R becomes the number of all the channels (one channel for one direction) in this method. While, in the above example, the address data is expressed in 4-bit words, when the number of the PAM modulation/demodulation portions is taken as n, the number of bits of n' becomes necessary, as derived from the following equation:

$$n = 2^{n'}$$

Thus, in this case, construction of CK.COUNT 23 will be a counter of at least modulo m, and word length in the one address of RAM-T 21 and RAM-R 22 will be n' bits. From this, n' bits will be sufficient for the construction of TSB-3 28 to TSB-6 33.

Here, for the construction of TSB-1 25 and TSB-2 26, m' bits will be sufficient, as derived from the following equation:

$$m = 2^{m'}$$

RESET DEC 35 will have a construction of n' bits, and the capacity of TO DEC 31 and RO DEC 36 will be of a construction of n' bits and n outs. In this case, as a matter of course, ADD.BUS 27 must be provided with m' bits, and DATA.BUS 30 with n' bits.

The clock frequency (fck) necessary for CKG will be as follows:

$$fck = 2fs \cdot m$$

where m is the number of all the channels described above, fs is the maximum frequency of the transmission band, and 2 is a coefficient according to the sampling theorem.

Here, if the number of channels for guaranteeing demodulation of fs is taken as mch, then the following relationship will be sufficient:

$$fck = 2 \cdot fs \cdot mch$$

That is, as the number of channels to be used increases, the sampling frequency to be applied to one PAM modulation/demodulation portion decreases, and, when the number of channels exceeds the mch, fs will be not guaranteed.

As to the control of the writing-in or reading-out from an outside source, since transmission of the sampling synchronous pulses for PAM modulation/demodulation portion is temporarily stopped as a matter of course, the process for the above must be carried out within a period of time which allows, in effect, no trouble or difficulty to occur. So far as the process can be carried out within such period of time, manual control may be employed. In this method, however, it is preferred to use a processor or a computer. According to an experiment, in the case where the transmission signals to be treated are audio signals, a period of time up to about 12.5 msec could be negligible for a writing-in/reading-out of 1 each sec.

As will be apparent from the above description, according to the invention, a network can be easily constructed by writing-in, rewriting or clearing the construction of the network in the memory. Further, the state of the network can be known by reading-out data of the memory for reviewing. Thus, control can be performed in a manner of assuming the memory as the network itself.

Further, synchronization of the sampling pulses of transmission and reception can be made by means of correspondance of addresses of memory, thus synchronizing process in a soft fashion being possible.

Further, when the number of channels to be used is small, service of high quality can be obtained, and, for increased amount of traffic requirement, sampling pulses can be effectively determined by decreasing quality. Further, an economical and compact arrangement can be obtained by means of existing IC's without necessity for providing special IC's designed exclusively use.

While the invention has been described in connection with the preferred embodiments wherein the invention has been applied to time division multiplexing PAM exchange systems, the invention is not limited to such an embodiment, but can also be applied to control for PCM, PWM time division multiplexing system, control for pattern displays such as a mosaic display panel, control for character displays, and the like.

It is, of course, to be understood that various changes and modifications can be made without departing from the spirit and scope of the invention as set forth in the appended claims.

What I claim is:

1. In a method for controlling the channel assignment of a time division multiplex network of the type that interconnects a large number of subscribers to each other through a selected smaller number of time division channels and includes a time division multiplex communication path to which the subscribers are each connected via individual modulation/demodulation circuits for modulating an analog signal to a pulse signal when transmitting the analog signal to said communication path and for demodulating the pulse signal to the analog signal when receiving the pulse signal from the communication path, the improvement comprising the steps of:

assigning each time division multiplex channel, in a sequential manner, to a particular subscriber addressor/addressee pair who presently desire to communicate or are communicating with one another along the communication path, the addressor and the addressee of each so-assigned channel each identified by subscriber address-data which corresponds to the respective modulation/demodulation circuit of the addressor or addressee;

storing, in a channel-by-channel sequence, the subscriber address-data of the addressor of each so-assigned channel in successive addressable storage locations in a transmission side read/write memory and the subscriber address-data of the addressee of each so-assigned channel in corresponding, successive storage locations in a reception side read/write memory;

storing reset data in a storage location in either said transmission side or said reception side memory following the last storage location that contains subscriber address-data;

reading-out, simultaneously and in sequence, the corresponding storage locations in said memories by addressing successive storage locations in response to a clock count;

decoding the subscriber address-data read-out from the transmission side memory and the subscriber address-data read-out from the reception side;

supplying the decoded subscriber address-data, as a sampling synchronous pulse, to the particular modulation/demodulation circuits corresponding to the read-out subscriber address-data;

reading-out the reset data; and resetting the clock count in response to said reset data.

2. In a method for controlling the channel assignment of a time division multiplex network of the type that interconnects a large number of subscribers to each other through a selected smaller number of time division channels and includes a time division multiplex communication path to which the subscribers are each connected via individual modulation/demodulation circuits for modulating an analog signal to a pulse signal when transmitting the analog signal to said communication path and for demodulating the pulse signal to the analog signal when receiving the pulse signal from the communication path, the improvement comprising the steps of:

assigning each time division multiplex channel, in a sequential manner, to a particular subscriber addressor/addressee pair presently desire to communicate or are communicating with one another along the communication path, the addressor and the addressee of each so-assigned channel each identified by subscriber address-data which corresponds to the respective modulation/demodulation circuit of the addressor or addressee;

storing, in a channel-by-channel sequence, the subscriber address-data of the addressor of each so-assigned channel in successive addressable storage locations in a transmission side read/write memory and the subscriber address-data of the addressee of each so-assigned channel in corresponding, successive addressable storage locations in a reception side read/write memory;

storing reset data in a storage location in either said transmission side or said reception side memory following the last storage location that contains subscriber address-data;

reading-out, simultaneously and in sequence, the corresponding storage locations in said memories by addressing successive storage locations in response to a clock count;

decoding the subscriber address-data read-out from the transmission side memory and the subscriber address-data read-out from the reception side;

supplying the decoded subscriber address-data, as a sampling synchronous pulse, to the particular modulation/demodulation circuits corresponding to the read-out subscriber address-data;
reading-out the reset data;
resetting the clock count in response to said reset data; and
connecting, in response to selectively applied control signals, said subscriber address-data storage locations of said memories to a bi-directional data buss that is adapted to be connected to a central processing unit whereby subscriber address-data may be read-out of said memories to said data buss and new subscriber address-data may be written into said storage locations of said memories from said data buss.

* * * * *

UNITED STATES PATENT AND TRADEMARK OFFICE
CERTIFICATE OF CORRECTION

PATENT NO. : 4,187,402
DATED : February 5, 1980
INVENTOR(S) : Jun Matsumoto

It is certified that error appears in the above-identified patent and that said Letters Patent are hereby corrected as shown below:

Col. 1, line 14, before "controlling" insert --of--.
Col. 1, line 60, delete "dots" and insert therefor --data--.
Col. 2, line 10, "write/in-rewrite" should read --write-in/rewrite--.
Col. 2, line 46, delete "each", first occurrence.
Col. 3, line 9, delete "makes" and insert therefor --places--.
Col. 3, line 41, the left-hand heading of the table should read --Address Data--, eliminating the elevated "Data".
Col. 4, line 27, delete "the".
Col. 4, line 30, delete "laste" and insert therefor --last--.
Col. 5, line 14, delete "8 X 04 bits," and insert therefor --8 X 4 bits,--.
Col. 5, line 43, after "register" insert --which--.
Col. 6, line 52, the left-hand heading of the table should read --Address Data--, eliminating the elevated "Data".
Col. 7, line 22, delete "RAM-T 22" and insert therefor --RAM-R 22--.
Claim 2, line 41, after "pair" insert --who--.

Signed and Sealed this

Tenth Day of June 1980

[SEAL]

Attest:

SIDNEY A. DIAMOND

Attesting Officer

Commissioner of Patents and Trademarks